United States Patent [19]
Jackson

[11] Patent Number: 6,144,687
[45] Date of Patent: Nov. 7, 2000

[54] LASER

[75] Inventor: Paul E. Jackson, Sturbridge, Mass.

[73] Assignee: Excitation LLC, Springfield, Mass.

[21] Appl. No.: 09/148,835

[22] Filed: Sep. 4, 1998

[51] Int. Cl.$^7$ .............................. H01S 3/081; H01S 3/08
[52] U.S. Cl. .............................. 372/99; 372/93; 372/95; 372/107
[58] Field of Search ................................ 372/99, 95, 93, 372/107

[56] References Cited

U.S. PATENT DOCUMENTS

| | | | |
|---|---|---|---|
| 4,423,511 | 12/1983 | Morton | 372/95 |
| 4,433,418 | 2/1984 | Smith | 372/95 |
| 4,550,410 | 10/1985 | Chenausky et al. | 372/97 |
| 4,719,639 | 1/1988 | Tulip | 372/66 |
| 4,809,285 | 2/1989 | Scully . | |
| 4,939,738 | 7/1990 | Opower | 372/95 |
| 5,048,048 | 9/1991 | Nishimae et al. | 372/95 |
| 5,123,028 | 6/1992 | Hobart et al. | 372/95 |
| 5,557,625 | 9/1996 | Durville . | |
| 5,644,589 | 7/1997 | Anthon | 372/92 |

FOREIGN PATENT DOCUMENTS

| | | | |
|---|---|---|---|
| 60-004282 | 10/1985 | Japan . | |
| 2-109382 | 4/1990 | Japan | 372/95 |

OTHER PUBLICATIONS

Copy of European Search Report Application No. EP 99 30 7062.

Y.C. See et al., "Coupled Optical Resonators for the Enhancement of Laser Intracavity Power", Applied Optics, vol. 20(7), Apr. 1, 1987.

R.R. Craig et al., "Etched–Mirror Unstable–Resonator Semiconductor Lasers", Electronic Letters, vol. 21(2), Jan. 17, 1985.

A.E. Siegman, "Retroflected Unstable Resonators" in "Lasers", University Science Books, Mill Valley, CA., ISBN19 855713–2, Chapter 23, pp. 906–908, 1986.

N. Hodgson and H. Weber, "Unstable Resonators with Excited Converging Wave", IEEE Journal of Quantum Electronics, vol. 26(4), Apr. 1990.

*Primary Examiner*—Frank G. Font
*Assistant Examiner*—Armando Rodriquez
*Attorney, Agent, or Firm*—McCormicks, Paulding & Huber LLP

[57] ABSTRACT

A laser includes a lasing medium having a slab geometry, a waveguide arrangement either side of the slab, mirrors forming an unstable sub-resonator acting in a plane perpendicular to the waveguide, and a concave mirror arrangement acting on light incident on it launched from the waveguide, and thereby transformed from waveguide light to free space light, to redirect and retransform a portion of said light to be re-entrant waveguide light constituting the unstable sub-resonator round-trip self-replicating light. The unstable sub-resonator preferably includes a folding mirror to direct light towards the concave mirror, and the concave mirror is preferably partially transmissive.

7 Claims, 2 Drawing Sheets

LASER

TECHNICAL FIELD OF THE INVENTION

The present invention relates to lasers.

BACKGROUND ART

In the field of high output power lasers, it is common to employ an unstable resonator. These normally require that the lasing medium be of a suitably high gain, for the simple reason that the significant output coupling of a simple two-dimensional circularly-symmetric unstable resonator is too high for efficient power generation from a modest gain laser, such as a $CO_2$ laser.

One way of overcoming this is to use a hybrid slab waveguide/unstable resonator. Examples of these can be seen in Tulip U.S. Pat. No. 4,719, 639, Nishimae U.S. Pat. No. 5,048,048 and Opower U.S. Pat. No. 4,939,738, each of which is herein incorporated by reference. Tulip employs a one-dimensional unstable resonator parallel to the long cross-sectional dimension of a slab laser, and a waveguiding arrangement which serves to confine the beam in a perpendicular dimension. This serves to reduce the output coupling and improve the power extraction efficiency. Such systems can be applied to negative-branch unstable resonators such as Nishimae, and to positiveresonators such as Opower.

A limitation on the design of such resonators within high power applications is that in order to improve mode discrimination and beam quality, the unstable resonator magnification needs to be increased. Within the context of a modest-gain lasing medium such as $CO_2$ lasers, this can only be achieved at the expense of over-coupling the laser output. This leads to a corresponding reduction in power extraction efficiency.

It is an object of the present invention to provide a laser which overcomes this limitation inherent to the above-described prior art.

It is also an object of the present invention to allow improvements in beam quality by increasing the unstable resonator magnification without causing a corresponding loss in power extraction efficiency.

SUMMARY OF THE INVENTION

The present invention therefore provides a laser comprising a lasing medium having a slab geometry, mirrors forming a sub-resonator, acting in at least the plane of the slab, and a mirror external to the sub-resonator and arranged to return a proportion of said light back into the sub-resonator, thereby to define, in combination, a resonator structure, the external mirror also being adapted to allow transmission of a proportion of said light as laser output from the resonator structure.

It is preferred if the external mirror is partially transmissive.

It is also preferred that the mirrors of the sub-resonator are totally reflecting. It is also preferred that they form an unstable resonator.

It is particularly preferred if the laser includes a folding mirror to direct light out of the unstable sub-resonator towards the external mirror. This mirror is preferably within the unstable sub-resonator, as this minimizes diffraction edge effects.

It is possible to confine the beam in the plane perpendicular to the slab either by means of a waveguide or by selection of a suitable curvature of the resonator mirrors in that plane. This curvature can provide either a stable or an unstable subresonator.

The external mirror may need to be concave, particularly if it is a distance from the sub-resonator. It will then check any divergence of the beam at that point.

BRIEF DESCRIPTION OF DRAWINGS

An embodiment of the present invention will now be described, by way of example, with reference to accompanying FIGS., in which.

DETAILED DESCRIPTION OF PREFERRED EMBODIMENT

Figure 1:
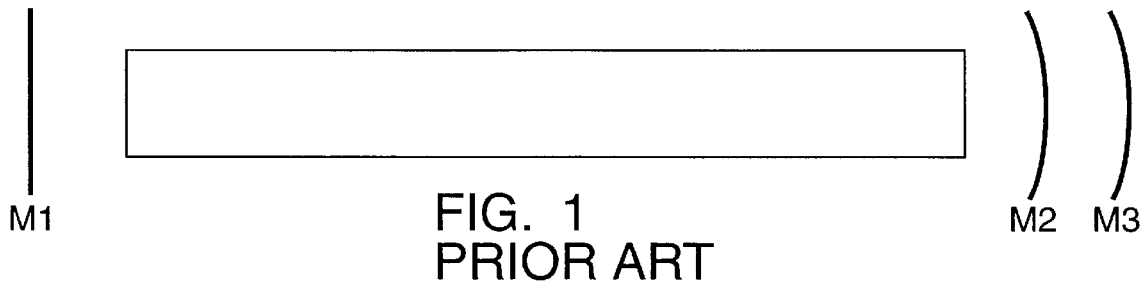
FIG. 1 illusrates a conventional double-cavity resonator.

FIG. 1 shows a conventional double cavity resonator, as applied to an argon-ion gas laser. An example is shown in the paper by Y. C. See et al, "Coupled Optical Resonators for the Enhancement of Laser Intracavity Power", Applied Optics 20 (7), 1211–1217, 1981, herein incorporated by reference. A pair of stable resonator cavities are formed by mirror pairs M1 & M2 and M1 & M3. Coupling is via the common transmitting mirror M1. The curvatures on the mirrors are chosen to match the phase curvature of the modes in the two cavities. This configuration is essentially a passive supplementary cavity coupled to the main cavity. Laser power extraction is through mirror M3. The mode structure of this double cavity differs substantially from a corresponding single cavity resonator.

Figure 2:
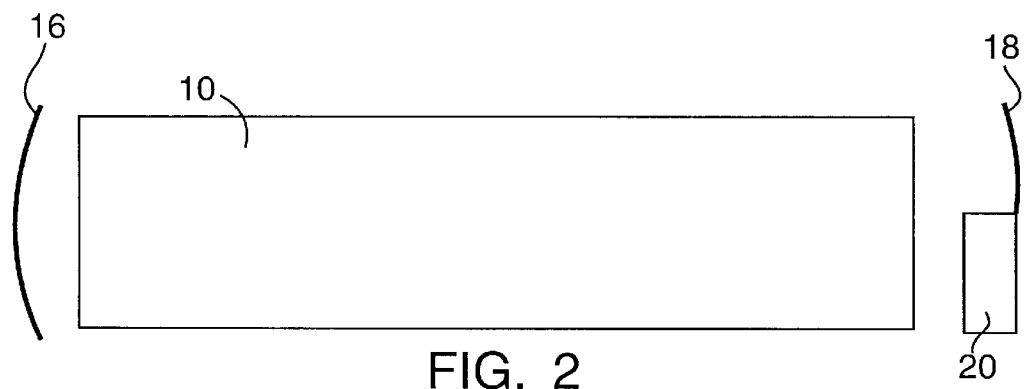
FIG. 2 shows a side view of an embodiment of the present invention.
Figure 3:
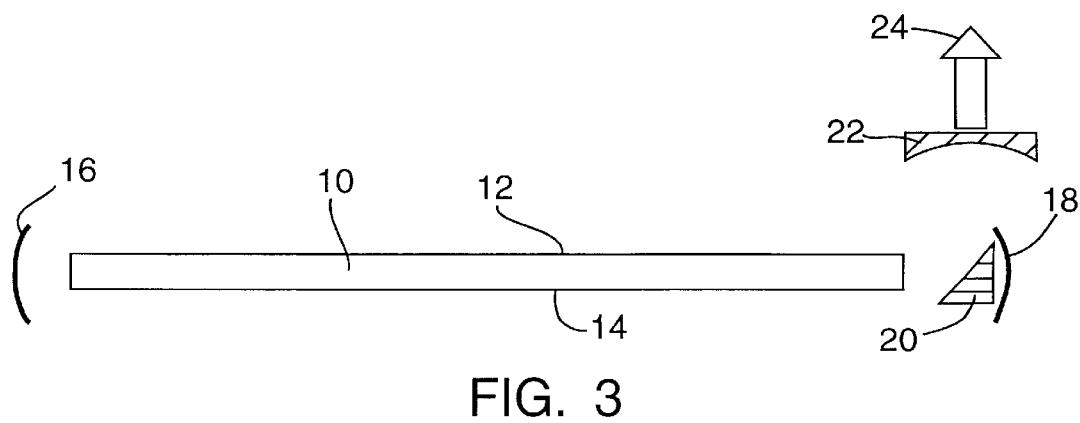
FIG. 3 shows a top view of an embodiment of the present invention.

FIGS. 2 and 3 illustrate a double cavity resonator according to the present invention. A slab geometry lasing material 10 is provided, with a wave guide arrangement on either side 12, 14 thereof. Two totally reflecting mirrors 16, 18 are provided at either end of the wave guide, and form an unstable sub-resonator. The rear mirror 16 extends over the full width of the wave guide cavity, whilst the front mirror 18 is of partial width only, covering one side only of the resonator. Adjacent the front mirror is a turning mirror 20 at 45° to the axis of the resonator, which deflects light to exit the sub-resonator at right angles to the sub-resonator axis. The deflected beam then meets a partially reflective concave mirror 22 (not visible on FIG. 2), external to the sub-resonator. The curvature of the external mirror 22 checks the divergence of the (now) intracavity resonator modes and returns light efficiently back into the wave guide. Some light is coupled out of the resonator structure through the external mirror, as shown at 24, and this forms the output laser beam.

This arrangement has substantial advantages over known lasers. In particular, the overall resonator structure comprises two mirrors forming the sub-resonator, one intracavity folding mirror, and the external mirror, not just two resonatorforming mirrors. In a preferred embodiment using a $CO_2$ laser, the partially reflective mirror 22 can include an uncoated (UC) first side and an anti-reflection (AR) coated second side ZnSe substrate. This results in a suitable reflectivity of approximately 17%. This partially reflective mirror 22 can replace the laser output window, meaning that the output is passed through a single AR coating, instead of a partially reflective (PR) and an AR coating in the case of J. C. See or an AR+AR coating in the case of Tulip, Nishimae and Opower. Thus, the output laser beam meets one less coating, giving a reduction in substrate thermal lensing caused by coating absorption. Such lensing is responsible for beam quality degradation in the laser output.

This arrangement also differs from that in Y. C. See in that the latter consists of stable resonator modes only. Conventional double cavity resonators do not include unstable resonator modes. Meanwhile the output mode from a conventional hybrid slab waveguide/unstable diffraction-coupled resonator such as Tulip, Nishimae and Opower consists of waveguide modes in the narrow dimension and free-space unstable resonator modes in the wide dimension. There are no stable resonator modes supported in the wide dimension. Embodiments of the present invention do support stable resonator modes in the cavity formed by the rear mirror 16 and the external mirror 22, and these modes then compete for optical gain with the modes in the cavity formed by the rear mirror 16 and the front mirror 18. The eigenmode set that constitutes the output of the entire resonator structure is then a combination of the two cavity modes.

Finally, the described embodiment of the invention differs from the arrangement of Y. C. See et al in that (in effect) hole coupling is employed between the cavities as opposed to transmission coupling.

According to a purely illustrative example of the invention, a multi-kilowatt $CO_2$ gas discharge laser is employed, with slab waveguide dimensions of 2 mm×115 mm×940 mm. A suitable output coupling for maximum laser power extraction from the slab resonator is about 24%. A suitable rear mirror curvature is 1100 mm and a front mirror curvature of 780 mm, with confocal spacing. This gives a resonator magnification of 1.41, and if used in the manner described by Nishimae (referenced above) a geometric output coupling of 29%. This represents a significant over-coupling of the output from the desired 24%, resulting in a decrease in laser power. With 17% reflectivity, 83% transmission and 250 mm radius of curvature partially reflective mirror 22 with a waveguide case III spacing of 125 mm from the end of the slab waveguide, the geometric output coupling drops to approximately 29% times 83%, i.e. 24% for near maximum laser power extraction.

It is expected that conventional resonators and resonators according to the above embodiment will yield approximately the same laser power. However, the resonator as set out above will provide a laser beam quality significantly enhanced by virtue of (inter alia) the increased magnification from (e.g.) 1.33 for a conventional resonator to 1.41.

In contrast to the simplified geometric treatment, the intracavity laser beams (modes) experience diffraction spreading traveling between mirrors. This along with diffraction ripples from mirror edges and apertures greatly complicates the exact mode behavior and output coupling. In addition, the partially reflective mirror 22 and the rear mirror 16 and front mirror 18 can form a stable resonator supporting Laguerre-gaussian modes. These modes compete for optical gain in tandem with the eigenmodes supported by the unstable sub-resonator formed by the rear mirror 16 and front mirror 18.

For positive-branch and negative-branch unstable sub-resonators, suitably characterized by a concave rear mirror 16 opposite a convex front mirror 18, or a concave rear mirror 16 opposite a concave front mirror 18, respectively; the exact mode behavior of the resonator is very sensitive to the exact phase angle and phase front curvature of the retroreflected optical energy fed back by the partially reflective mirror 22 into the converging paraxial eigenwave of the unstable resonator. The phase is determined by the position and tilt of the external mirror 22. In this case the retroreflected optical energy demagnifies down telescopically into the on-axis 23 center of the unstable sub-resonator and then eventually emerges again as an addition to the magnifying wave.

Uniquely, with the incorporation of the negative-branch unstable subresonator the exact mode behavior of the resonator is very sensitive to both the exact phase of the retroreflected optical energy fed back by the external mirror 22 into the converging paraxial eigenwave of the unstable resonator, and to the exact phase of the retroreflected optical energy fed back by the external mirror 22 into the paraxial eigenwave of the stable resonator. In the latter case, for certain phase conditions the retroreflected optical energy takes a three-mirror stable resontor path 25 that supports Laguerre-gaussian modes.

Figure 4:
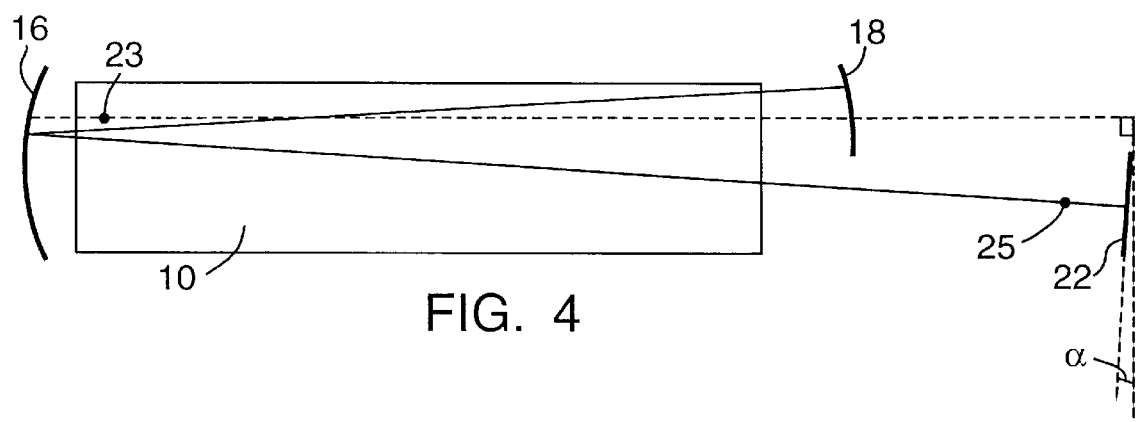
FIG. 4 shows a similar view of another arrangement.
Figure 5:
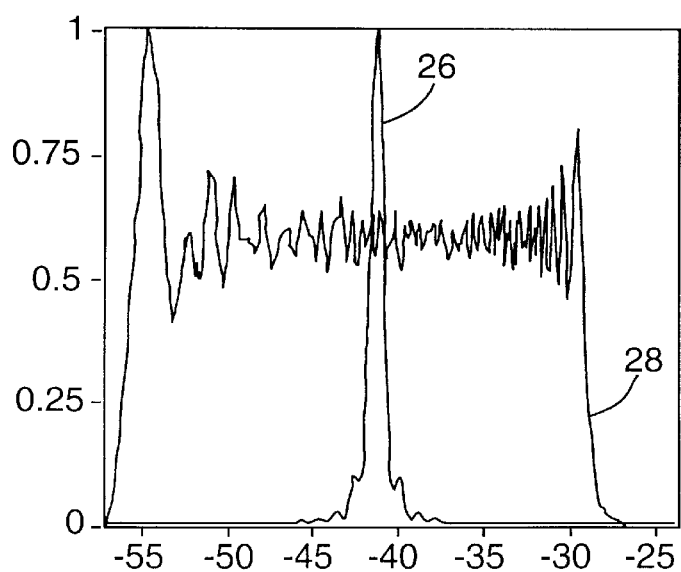
FIG. 5 illustrates stable and unstable resonator modes.

A rigorous determination of the resonator output coupling, superseding the geometric treatment described above, is provided by complex eigenwave numerical calculations using (for example) fast-Hankel transformations. FIG. 4 illustrates the unstable and stable resonator axes for an embodiment of the invention described above, with their corresponding one-dimensional eigenmodes solutions shown in FIG. 5. Note that FIG. 5 illustrates the predominantly lowest-order eigenmode solution for the resonators, although higher-order eigenmodes can exist when they exceed their threshold for lasing, reached when their resonator round-trip optical gain exceeds their round-trip optical loss. The eigenmode for stable resonators in the preferred embodiment may also be calculated using closed-form equations and matrices. In this case, the lowest-order eigenmode solution is a gaussian beam waist of 1.386 mm for a partially reflective mirror 22 tilt of 0.0386 radians. This is consistent with the stable mode of FIG. 5.

The output of the example resonator above is then a combination of unstable and stable resonator mode sets, including the modes shown in FIG. 5.

This shows the normalized intensity against the distance from the center-line of the primary mirror. The weighting of these stable (28) and unstable (26) modes and their higher-order mode counterparts is competitive and dependent on factors such as optical gain saturation, the alignment of the resonator mirrors 16, 18 and 22, and intracavity aperturing. The combination is not simply a vector addition of pure (in the absence of a saturable gain medium) unstable and stable resonator eigenmodes, as if they existed independently, but the combination of perturbed unstable and stable resonator modes. The coincidence of the tandem resonators and the overlap of their modes in a saturable optical gain lasing medium generates a new mode containing intensity and phase unique to the present invention. The tilt-alignment of the partially reflective mirror 22 facilitates the selection of stable and unstable resonator modes for the desired resonator output.

In addition to the resonator transverse eigenmodes described above, there are longitudinal modes coinciding with mirror separations that satisfies the conditions for resonance. The resonance condition will be satisfied (approximately) for the unstable resonator modes when multiples of quarter-wavelength light fit into the resonator beam path difference between the spacing of the rear mirror 16 and the partially reflective mirror 22 and the spacing of the rear mirror 16 and the front mirror 18, and when simultaneously multiples of half-wavelength light fit into the beam path 20 spacing of the rear mirror 16 and the front mirror 18. For the stable resonator, the resonance condition is satisfied when multiples of half-wavelength light fit into the resonator beam path shown in FIG. 4. Any variation in the resonator lengths (for example due to thermal expansion) is compensated by a wavelength change favoring the resonant longitudinal mode with the highest round-trip gain-to-loss ratio above the threshold for lasing. The laser signature is the laser output power variation cycle that arises as the favored longitudinal mode sweeps through and hops between the homogeneously broadened gain profiles of the discrete laser transitions (lines) of the lasing medium.

The laser signature from the present invention will differ from a conventional hybrid/unstable diffraction-coupled resonator such as Tulip, Nishimae and Opower by virtue of the new resonance conditions imposed by the inclusion of the partially reflective mirror 22.

It should of course be understood that the above-described embodiment is given for illustrative purposes only. Many variations can be made thereto without departing from the scope of the present invention.

What is claimed is:

1. A laser, comprising:

a lasing medium, having a slab geometry, mirrors forming a sub-resonator, acting in at least the plane of the slab, and a mirror external to the sub-resonator and arranged to return a portion of light exciting said sub-resonator back into the sub-resonator, thereby to define, in combination, a resonator structure, the external mirror also being adapted to allow transmission of a proportion of said light as laser output from the resonator structure.

2. A laser according to claim 1 wherein the external mirror is partially transmissive.

3. A laser comprising:

a lasing medium, having a slab geometry;

mirrors forming a sub-resonator, acting in at least the plane of the slab; a mirror external to the sub resonator and arranged to return a portion of light back into the sub-resonator, thereby to define, in combination, a resonator structure, the external mirror also being adapted to allow transmission of a proportion of said light as laser output from the resonator structure; and wherein the laser further includes a folding mirror to direct light towards the external mirror.

4. A laser according to claim 3 wherein the folding mirror is within the sub-resonator.

5. A laser according to claim 1 including a waveguide arrangement to confine light in a direction perpendicular to the plane of the slab.

6. A laser according to claim 1 wherein the sub-resonator is unstable.

7. A laser according to claim 1 wherein the external mirror is concave.

* * * * *